United States Patent Office 2,776,287
Patented Jan. 1, 1957

2,776,287

PROCESS FOR THE PREPARATION OF THERAPEUTIC COMPOUNDS

Kurt Ladenburg, Yorktown Heights, Bernard F. Duesel, Yonkers, and Theodore I. Fand, White Plains, N. Y., assignors to Nepera Chemical Co., Inc., Yonkers, N. Y., a corporation of New York No Drawing. Application February 2, 1954,
Serial No. 407,816

11 Claims. (Cl. 260—256)

This invention relates to the preparation of therapeutic compounds and relates more particularly to an improved process for the preparation of those compounds comprising the condensation products obtained by reacting a dialkylxanthine with a quaternary ammonium hydroxide.

An object of this invention is to provide an improved process for the preparation of the condensation products of a dialkylxanthine with a quaternary ammonium hydroxide so that the resulting condensation products will be free of inorganic salts or other undesirable materials.

Other objects of this invention will appear from the following detailed description.

The therapeutic value of the condensation products of the dialkylxanthine alkaloids, such, as for example, theophylline, theobromine or paraxanthine, or their 8-substituted derivatives having a bromine, chlorine or nitro group in the 8-position, with a quaternary ammonium hydroxide such as choline, has been established. In the preparation of these compounds, one of the methods employed is to react an aqueous solution of an acid salt of the quaternary ammonium compound, such as the chloride, for example, with an alkali metal salt of the dialkylxanthine in an organic solvent such as methanol, ethanol or isopropanol. The alkali metal chloride formed as a product of the reaction precipitates and is filtered off, while the condensation product which remains in the hot solution may then be separated from the solvent by steps involving evaporation, crystallization, etc. Alternatively, the chloride salt of the quaternary ammonium compound may be dissolved in an organic solvent and the salt then converted to the free base or hydroxide form by reacting it with an alkali metal hydroxide, such as sodium or potassium hydroxide. The free base exists only in solution. The alkali metal salt which forms on converting the salt to the free base is insoluble and precipitates from solution. The salt is filtered off and the free quaternary ammonium hydroxide base which is in solution is then reacted with the desired dialkylxanthine. The latter may be conveniently dissolved or suspended in a suitable solvent and the mixture added to the solution of the free base. The condensation product formed is then separated from the solvent mixture comprising the reaction medium by evaporation and crystallization. It may then be further purified by recrystallization, if necessary.

While the yields of the desired condensation products utilizing the foregoing processes are generally satisfactory, it has been found that the products obtained usually contain some of the inorganic alkali metal salt which is formed as a by-product. This salt impurity cannot readily be separated to yield a salt-free product. For some purposes, the presence of a relatively small amount of a sodium, potassium or other alkali metal salt is not objectionable, but in instances where the ingestion of additional sodium or potassium ions is therapeutically undesirable and contra-indicated, the elimination of the salts of these alkali metals which are present as impurities become imperative.

We have now found that the condensation of a dialkylxanthine, or an 8-substituted derivative thereof, with a quaternary ammonium hydroxide may be effected conveniently and the condensation product obtained in a satisfactorily high yield without the incorporation of an alkali metal salt therein if the quaternary ammonium hydroxide reacted with the dialkylxanthine is employed in the form of its acid salt with a readily decomposable acid. Accordingly, the quaternary ammonium hydroxide may be employed as the bicarbonate or as the bisulfite salt, for example. These salts are readily decomposable to yield the free base. As examples of other readily decomposable acid salts of the quaternary ammonium hydroxides there may be mentioned the hydrosulfide as well as the thiosulfate and carbamate salts. In an acid solution, such as that obtained on introduction of a dialkylxanthine which is acid in reaction and which decreases the pH, the decomposition of the salt takes place readily with the liberation of carbon dioxide or of sulfur dioxide, or other salt decomposition products, as the case may be, and the free base which is obtained in the solution reacts immediately with the dialkylxanthine present. The reaction is usually completed on heating the reaction mixture to temperatures of 40° to 100° C. for 1 to 5 hours.

Thus, for example, when the condensation product of choline and theophylline is being prepared and the choline is employed in the form of its bicarbonate salt, the condensation reaction liberates carbon dioxide and the free choline base and upon reaction, the condensation product is obtained in a form entirely free of any inorganic salt since the by-product is eliminated in gaseous form. Heating serves to further drive it out of solution. Elaborate procedures for the elimination of undesirable inorganic salts are, as a consequence, quite unnecessary and may be entirely eliminated. Accordingly, this novel process affords a means for not only producing a better product but also more economically.

The quaternary ammonium hydroxide whose easily decomposable acid salts may be employed in the novel process described are compounds of the following formula

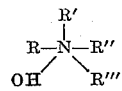

wherein R′, R″ and R‴ are lower alkyl groups containing one to three carbon atoms and R is an alkyl group which may be further substituted by hydroxy, alkoxy or aryl groups. As examples of said compounds there may be mentioned trimethylhydroxyethylammonium hydroxide, trimethylbenzylammonium hydroxide, trimethylhexylammonium hydroxide, trimethyloctylammonium hydroxide, trimethyldecylammonium hydroxide, trimethyldodecylammonium hydroxide, and others containing up to sixteen carbon atoms in the alkyl group. Trimethylhydroxyethylammonium hydroxide is a quaternary ammonium hydroxide compound which is more commonly known as choline. These compounds are quite suited to the present process since they form salts which are readily decomposable to yield a volatile by-product. In the case of the thiosulfate not only is a volatile decomposition product formed but an insoluble product, i. e., elemental sulfur, is also formed. This insoluble by-product may be readily filtered off.

While the dialkylxanthines, including theophylline, theobromine and paraxanthine, which are more particularly described as being suitable in this novel process are each dimethylxanthines, the novel process of our invention is readily applicable to the preparation of condensation products of other dialkylxanthines containing other lower alkyl substituents such as the diethylxanthines and mixed compounds, e. g. methylethylxanthines. Dialkylxanthines containing a substituent in the 8-position such as a chloro-, bromo- or nitro-group may also be utilized in this novel process, as mentioned above.

In forming the condensation products described, one mol of the acid salt of the quaternary ammonium hydroxide reacts with one mol of the dialkylxanthine employed with the condensation reaction resulting in the liberation of one mol of water. The mechanism of the reaction described is believed to involve the decomposition of the quaternary ammonium acid salt in the acid medium which results upon addition of the acid dialkylxanthine and the condensation reaction then takes place between the resulting free quaternary ammonium base and the dialkylxanthine present. As the acidity decreases during the reaction, it is usually desirable to subject the reaction mixture to heating preferably under reflux to aid in the decomposition of the remaining acid salt and to ensure a more complete condensation reaction.

In separating the product, it is important to remove as much water as possible from the reaction mixture. This may be accomplished by distillation at atmospheric pressure or under vacuum. Another particular feature of our novel process involves the removal of the water present by azeotropic distillation means employing isopropyl alcohol as the entraining agent or using a mixture of isopropyl alcohol and benzene. Most advantageously, the entraining agent employed should be water-immiscible and should yield two phases so that the azeotrope condensate may be easily separated, the water decanted and the entraining agent returned to the system.

In order further to illustrate the novel process of this invention, the following examples are given:

*Example I*

18 parts by weight of theophylline are added to 37.8 parts by weight of aqueous choline bicarbonate (47% assay) and the mixture stirred and heated at 80 to 90° C. until the evolution of carbon dioxide has ceased and complete solution effected. Water is separated from the reaction mixture by distillation under a vacuum sufficient to keep the still temperature between 50 and 55° C. After about 15 parts by weight of water have been separated, about 80 parts by weight of isopropyl alcohol are added and the mixture subjected to further distillation under a vacuum sufficient to keep the mixture boiling at about 40° C. The distillation removes some of the water as an azeotrope with the isopropyl alcohol. During the removal of the water-isopropyl alcohol azeotrope a crystalline precipitate forms. The mixture is further cooled slowly to 5° C. and the crystalline precipitate filtered off. The choline theophyllinate crystals are then washed with isopropyl alcohol and dried under vacuum at about 70° C. A second crop of the product may be obtained from the mother liquor by further reduction in volume and cooling. A yield of 90.5% of theory of choline theophyllinate is obtained completely free of inorganic salts.

*Example II*

25.9 parts by weight of technical 8-brom-theophylline are added slowly with stirring to 37 parts by weight of an aqueous solution containing 45% by weight of choline bicarbonate. Carbon dioxide is evolved during the addition. The reaction mixture is then warmed to 50° C. for about one-half hour. The insoluble material present is filtered off and the clear solution diluted with about 80 parts by weight of isopropyl alcohol. About 60 parts by weight of a water-isopropyl alcohol azeotrope is distilled over under a vacuum of 20 mm. of mercury by heating the mixture to a temperature of about 50° C. Another 80 parts by weight of isopropyl alcohol are added and another 60 parts by weight of the water-isopropyl alcohol azeotrope are distilled over. 40 parts by weight of benzene are added and the mixture distilled until it becomes clear after which it is cooled slowly to about 0° C. The choline-8-brom-theophyllinate which crystallizes out is filtered off, washed with a 2:1 mixture of benzene and isopropyl alcohol and then dried at 40° C. A second crop of the product may be obtained by concentrating the filtrate. A combined yield of about 90% of theory is obtained and the product is free of any inorganic salts.

*Example III*

85 parts by weight of theophylline are added to about 92 parts by weight of isopropyl alcohol and the suspension heated to 60° C. While stirring 178.5 parts by weight of aqueous 48.5% choline bicarbonate solution are added and the mixture obtained stirred for about 30 minutes. The solution obtained is cooled below 40° C. and distilled under a vacuum sufficient to permit boiling with the pot temperature held below 65° C. About 150 parts by weight of the water-isopropyl alcohol azeotrope are taken overhead. 100 parts by weight of isopropyl alcohol are then added and another 75 parts by weight of the water-isopropyl alcohol azeotrope distilled over. The azeotropic distillation is repeated several times to remove as much water as possible. The isopropyl alcohol solution remaining is cooled to 5° C. and the crystallization of the choline theophyllinate present is completed. The product is filtered off, centrifuged, washed with isopropyl alcohol and then dried at a temperature preferably below 80° C. A yield of choline theophyllinate of 94% of theory is obtained.

*Example IV*

102 parts by weight of 8-nitro-theophylline are added to about 92 parts by weight of isopropyl alcohol and the suspension heated to 60° C. While stirring 178.5 parts by weight of aqueous 48.5% choline bicarbonate solution are added and the mixture obtained stirred for about 30 minutes. Add 30 parts benzol and distill off the water azeotropically by means of a decanter system whereby the overhead is a ternary distillate consisting of water-isopropanol-benzene. The latter is condensed and is permitted to separate or phase out into two layers and the aqueous layer is constantly drawn off while permitting the layer of benzol to return to the boiler. When the water has been completely removed, the mixture is cooled to 5° C. and the crystallization of the choline 8-nitro-theophyllinate present is completed. The product is filtered off, centrifuged, washed with isopropyl alcohol and then dried at a temperature preferably below 80° C. A yield of choline 8-nitro-theophyllinate of 94% of theory is obtained.

It is understood that the foregoing detailed description is given merely by way of illustration and that many variations may be made therein without departing from the spirit of our invention.

Having described our invention, what we desire to secure by Letters Patent is:

1. Process for forming the condensation product of choline with a di-lower alkyl-xanthine, which comprises reacting a di-lower alkyl-xanthine in a solvent medium with choline bicarbonate, decomposing said choline bicarbonate, causing the di-lower alkyl-xanthine to condense with the free choline formed, and separating the condensation product from the solvent medium.

2. Process for the condensation of choline and theophylline which comprises reacting theophylline with choline bicarbonate.

3. Process for the condensation of choline and 8-brom-theophylline which comprises reacting 8-brom-theophylline with choline bicarbonate.

4. Process for the condensation of choline and 8-nitro-theophylline which comprises reacting 8-nitro-theophylline with choline bicarbonate.

5. Process for the condensation of choline and theobromine which comprises reacting theobromine with choline bicarbonate.

6. Process for the condensation of choline and theophylline, which comprises reacting an aqueous solution of choline bicarbonate with theophylline in a reaction medium containing an inert organic solvent, decomposing the choline bicarbonate present to yield choline base and carbon dioxide, removing the carbon dioxide, condensing the choline base formed with the theophylline present, and separating the choline theophyllinate condensation product from the solvent medium.

7. Process for the condensation of choline and theophylline, which comprises reacting an aqueous solution of choline bicarbonate with theophylline in a reaction medium containing an inert organic solvent, decomposing the choline bicarbonate present to yield choline base and carbon dioxide, removing the carbon dioxide, condensing the choline base formed with the theophylline present, removing substantially all of the water from the reaction medium by azeotropic distillation, and separating the choline theophyllinate condensation product formed from the solvent medium.

8. Process for the condensation of choline and theophylline, which comprises reacting an aqueous solution of choline bicarbonate with theophylline in a reaction medium containing an inert organic solvent, decomposing the choline bicarbonate present to yield choline base and carbon dioxide, removing the carbon dioxide, condensing the choline base formed with the theophylline present, removing substantially all of the water from the reaction medium by azeotropic distillation, employing benzene as entraining agent, and separating the choline theophyllinate condensation product formed from the solvent medium.

9. Process for the condensation of choline and theophylline, which comprises reacting an aqueous solution of choline bicarbonate with theophylline in a reaction medium comprising isopropyl alcohol, decomposing the choline bicarbonate present to yield choline base and carbon dioxide, removing the carbon dioxide, condensing the choline base formed with the theophylline present, removing substantially all of the water from the reaction mixture by distilling off an isopropyl alcohol-water azeotrope, and separating the choline theophyllinate formed from the reaction medium.

10. Process for the condensation of choline and 8-brom-theophylline, which comprises reacting an aqueous solution of choline bicarbonate with 8-brom-theophylline in a reaction medium containing an inert organic solvent, decomposing the choline bicarbonate present to yield choline base and carbon dioxide, removing the carbon dioxide, condensing the choline base formed with the 8-brom-theophylline present, removing substantially all of the water from the reaction medium by azeotropic distillation employing isopropyl alcohol as entraining agent, and separating the choline 8-brom-theophyllinate formed from the solvent medium.

11. Process for the condensation of choline and 8-nitro-theophylline, which comprises reacting an aqueous solution of choline bicarbonate with 8-nitro-theophylline in a reaction medium containing isopropyl alcohol, decomposing the choline bicarbonate present to yield choline base and carbon dioxide, removing the carbon dioxide, condensing the choline base formed with the 8-nitro-theophylline present, removing substantially all of the water from the reaction medium by azeotropic distillation employing benzene as entraining agent so as to distill off a ternary azeotrope of water-isopropanol-benzene, and separating the choline-8-nitro theophyllinate formed from the solvent medium.

References Cited in the file of this patent

UNITED STATES PATENTS

| | | |
|---|---|---|
| 2,661,352 | Feinstone et al. | Dec. 1, 1953 |
| 2,667,487 | Feinstone | Jan. 26, 1954 |